June 14, 1966 W. J. FLYNN 3,255,733
HANDICAPPING STARTING ARRANGEMENT FOR HORSE RACING
Filed Sept. 23, 1964 2 Sheets-Sheet 1

INVENTOR.
WILLIAM J. FLYNN

June 14, 1966     W. J. FLYNN     3,255,733
HANDICAPPING STARTING ARRANGEMENT FOR HORSE RACING
Filed Sept. 23, 1964     2 Sheets-Sheet 2
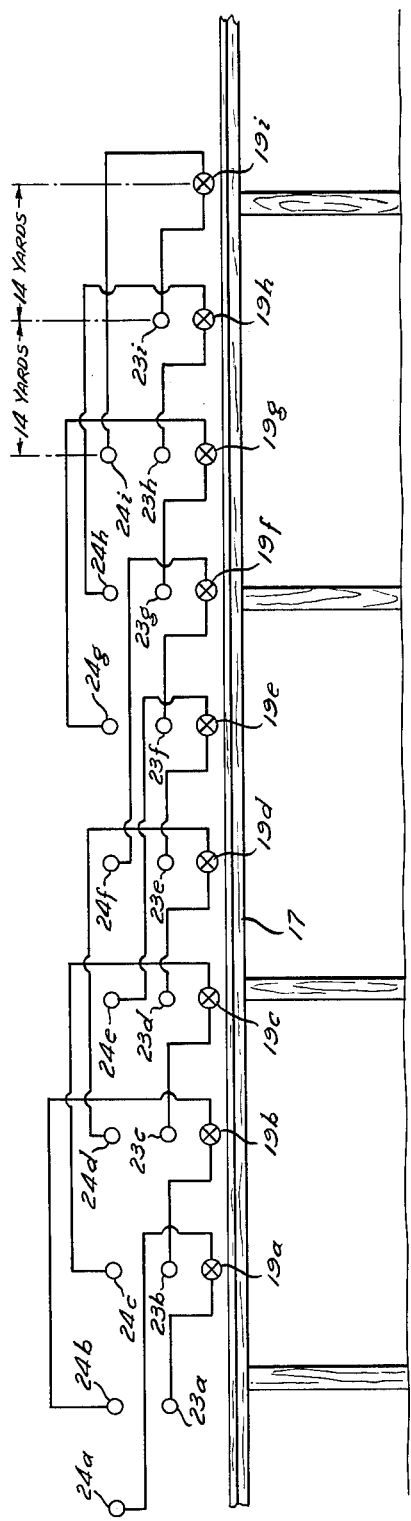
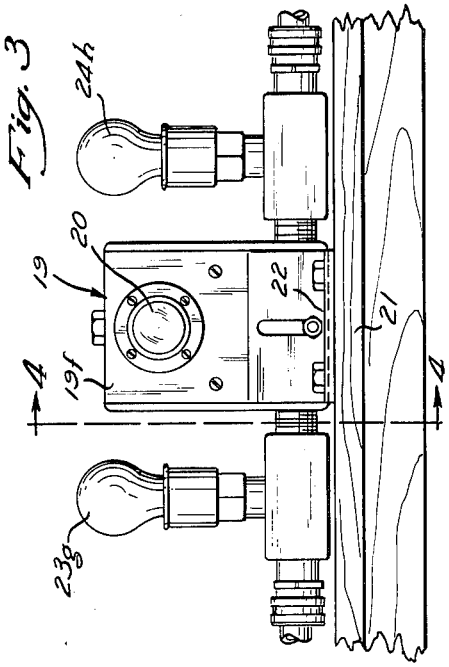
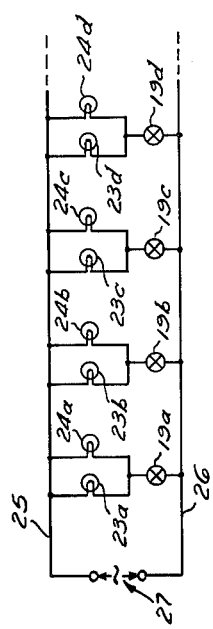
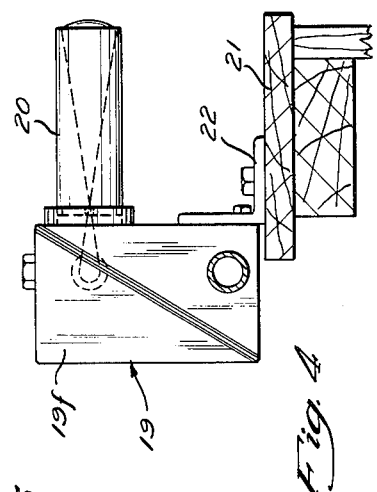
INVENTOR.
WILLIAM J. FLYNN United States Patent Office
3,255,733
Patented June 14, 1966

3,255,733
HANDICAPPING STARTING ARRANGEMENT
FOR HORSE RACING
William J. Flynn, 2691 W. St. James Parkway,
Cleveland Heights, Ohio 44106
Filed Sept. 23, 1964, Ser. No. 398,642
9 Claims. (Cl. 119—15.5)

This invention relates to a handicapped start arrangement for races having a running start under the control of a starting gate which moves over a predetermined approach to the starting line of the race, particularly harness races.

In harness racing, the horses have a running approach to the starting line behind a moving starting gate which gradually increases speed as it leads the horses in the approach run to the starting line and then pulls away from the horses shortly before they reach the starting line. Such races normally are unhandicapped, with all of the horses running even with each other (or having the opportunity to do so) directly behind the moving starting gate as it approaches the starting line. Because of the lack of a handicap, it is usually unfeasible to put in the same race horses whose records indicate a substantial difference in their racing capabilities. Owners of slower horses are understandably reluctant to match them against faster horses, and consequently it is often difficult to set up a race with a sufficient number of starters when a superior horse is entered. Prior to the present invention, no effective and acceptable handicapping arrangement for such races has been proposed.

The present invention is directed to a novel and improved handicapped start arrangement for races of this general type. In accordance with this arrangement, the driver of a handicapped horse in a harness race, for example, is supposed to keep his horse a predetermined handicap distance behind the moving starting gate as the gate approaches the starting line, so that the handicapped horse will be that far behind the unhandicapped horses at the start of the race. To enable the handicapped driver to stay the correct handicap distance behind the starting gate, a plurality of visual indicators are provided along the approach to the starting line. These visual indicators are operated by sensing devices which operate in response to the movement of the starting gate past them, the arrangement being such that the last-operated visual indicator in the series is operated at the handicap distance behind the moving starting gate. By keeping even with the visual indicators as they are operated in succession, the handicapped driver will maintain the correct handicap distance behind the starting gate. Preferably, the visual indicators are lamps which are distinctively colored to correspond to the particular handicap (e.g., red for a one second handicap, green for a two second handicap). The operation of such lamps as the horses approach the starting line, particularly in night races, adds to the spectator appeal of such races, in addition to the increased interest generated by matching one or more superior, but handicapped, horses against slower horses in the same race.

Accordingly, it is a principal object of this invention to provide a novel and improved handicapped start arrangement for races having a running start.

Another object of this invention is to provide such a handicapped start arrangement which is especially advantageous for use in harness horse racing.

Further objects and advantages of this invention will be apparent from the following detailed description of a presently-preferred embodiment thereof, which is illustrated schematically in the accompanying drawings.

In the drawings:

FIGURE 2 is a schematic diagram showing the positions of the visual indicator lamps and the photoelectric sensing devices along the inside rail of the track, in accordance with a preferred embodiment of the present invention.

FIGURE 3 is a front elevational view showing one of these sensing devices and the nearby indicator lamps on the inside rail of the track;

FIGURE 4 is an end elevational view of the sensing device, taken along the line 4—4 in FIG. 3; and FIGURE 5 is a schematic electrical circuit diagram showing the photoelectric sensing devices and the associated indicator lamps in the present invention.

Figure 1:
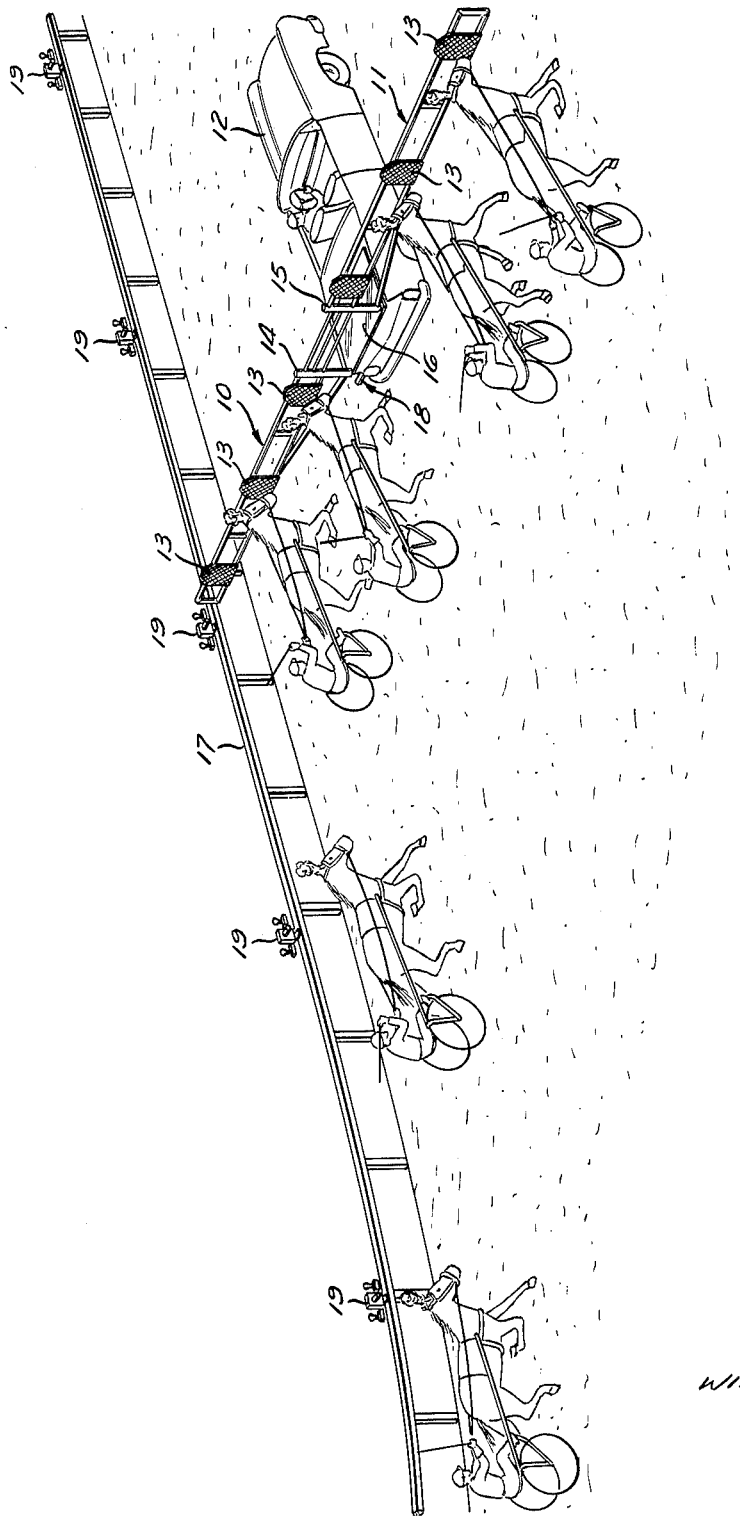
FIGURE 1 is a schematic perspective view showing the running approach to the start of a harness race, with certain of the horses handicapped in accordance with the present invention.

Referring first to FIG. 1, the moving starting gate comprises the usual laterally outwardly extending gate arms 10 and 11 pivotally mounted on the rear end of an automobile 12. These gate arms carry the usual wire retaining panels 13 which show the proper lane positions for the horses. The gate arms 10 and 11 are mounted on vertical pivots 14 and 15, and a suitable battery-operated mechanism is provided in the trunk 16 of the car for moving the gate arms inwardly against the respective sides of the car when the car pulls away from the horses at the start of the race.

While the car approaches the starting line for the race, the gate arms 10 and 11 extend laterally outward, as shown in FIG. 1, to provide a moving physical barrier extending across the track. As the starting line is approached, each driver of an unhandicapped horse strives to have his horse closely behind the respective panel 13 on the starting gate which corresponds to his assigned lane position.

When the starting gate is about 1/16 mile from the starting line, it rapidly picks up speed and pulls away from the horses to permit an unobstructed running start for them. Also, at this time the gate arms 10, 11 are folded inwardly against the side of the car.

In accordance with a preferred embodiment of the present invention, the starting gate is provided with a light source, preferably a sealed beam lamp 18, which directs an approximately horizontal beam of light laterally toward the inside rail 17 of the track. This lamp, which is partly hidden in FIG. 1, is at the left rear corner of the car 12.

A plurality of sensing devices in the form of photoelectric cells 19 are mounted at evenly spaced intervals along the rail 17. The laterally directed light beam from the starting gate impinges upon these photoelectric cells individually in succession and operates each one substantially immediately as the starting gate moves over its approach run to the starting line of the race. As shown in FIG. 4, each of these photoelectric cells 19 is provided with a weatherproof housing, preferably having a laterally inwardly projecting, elongated, optical lens assembly 20 which is adapted to be focused precisely, so that the cell will not be operated except by a light beam shining directly on it. Accordingly, the cell will not respond to light sources other than the laterally beamed lamp 18 on the starting gate. Each photoelectric cell 19 is rigidly supported above the top 21 of the inside rail 17 of the track, such as by a bracket 22.

These photoelectric cells 19 are connected to control individual visual indicators in the form of distinctively colored electric lamps, also mounted on the side rail 17 of the track and visible to drivers of the handicapped horses. FIGURE 2 illustrates schematically a series of the photoelectric cells, designated in succession as 19a, 19b, 19c, 19d, etc., and corresponding indicator lamps, 23a, 23b, 23c, 23d, etc., which are distinctively colored for the one-second handicap horse or horses. Each of these lamps 23a, 23b, etc., is positioned the one-second handicap distance behind the respective photoelectric cell 19a, 19b, etc. which controls it. For example, if the track is rated at a 2:05 minute mile, the one-second handicap distance will be approximately 14 yards. Under these circumstances, lamp 23a will be 14 yards behind the photoelectric cell 19a which controls it, lamp 23b will be 14 yards behind its photoelectric cell 19b, and so on.

A second series of lamps 24a, 24b, 24c, 24d, etc. are also connected to be operated by the respective photoelectric cells 19a, 19b, 19c, 19d, etc. Each of these lamps is the two-second handicap distance (28 yards) behind the photoelectric cell which controls it and is distinctively colored to indicate the two-second handicap.

FIGURE 5 shows schematically the electrical circuit diagram of the photoelectric cells 19a, 19b, 19c, etc. and the one-second handicap lamps 23a, 23b, 23c, etc. and two-second handicap lamps 24a, 24b, 24c, etc. which they control. One-second handicap lamp 23a and two-second handicap lamp 24a are connected in parallel with each other and both are in series with the photoelectric cell 19a across lines 25 and 26, connected across a suitable 110 volt A.C. power supply 27. The same is true of lamps 23b and 24b and the corresponding photoelectric cell 19b, lamps 23c and 24c and the corresponding photoelectric cell 19c, and so on.

Each photoelectric cell 19 is, in effect, a light-operated switch connected in series with the respective handicap-indicating lamp across the power supply. The photoelectric cell may be normally open, in which case the corresponding handicap-indicating lamp is normally unlit, or it may be normally closed, in which case the corresponding handicap-indicating lamp is normally lit. In the former case, the driver of a handicapped horse sees the lamps for his handicap go on in succession as the starting gate approaches the starting line, and he tries to keep his horse even with the lamp which has just gone on. In the latter case, the driver of a handicapped horse sees the distinctively colored lamps for his handicap go out in succession as the starting gate approaches the starting line, and he tries to keep his horse even with the lamp which has just gone out.

As shown in FIG. 3, the support bracket 22 for a particular photoelectric cell, in this instance the cell 19f, may also support a one-second handicap lamp 23g and a two-second handicap lamp 24h, which are operated respectively by other photoelectric cells farther ahead along the rail 17, as shown in FIG. 2.

The several photoelectric cells, which sense the movement of the starting gate along its approach to the starting line, may be spaced apart at any desired intervals along the rail 17, such as one-second, or greater or lesser, intervals.

In the operation of this system, when the starting gate goes past a particular photoelectric cell 19 in FIG. 1 it operates (either turning off or turning on) a one-second handicap lamp which is about 14 yards behind it, a two-second handicap lamp 28 yards behind, and if, desired, a three-second handicap lamp 42 yards behind. The driver of a one-second handicap horse tries to keep his horse even with his handicap lamps as they are operated (going off or going on), so that he will stay the proper handicap distance behind the starting gate as the field of horses moves with progressively increasing speed toward the starting line. In this manner, the entire field has a running start, but the handicapped horses are at the proper handicap distance behind the unhandicapped horses throughout the approach run to the starting line.

While a presently-preferred embodiment of this invention has been shown and described, it is to be understood that the invention is susceptible of other embodiments differing from the particular arrangement shown. For example, if desired, the laterally beamed light source on the starting gate may be omitted and a light source provided at each photoelectric cell, producing a beam of light which is broken by the starting gate as it moves by to operate the cell. Also, instead of physically spacing each handicap lamp the required handicap distance along the rail behind the photoelectric cell which operates it, it may be positioned close to its cell and a suitable time delay arrangement provided between them to delay the operation of the lamp until the required handicap time after the operation of the cell by the movement of the starting gate past it. Also, if desired, the sensing devices may be operated by other than a light-signalling arrangement, such as ultrasonically or by radio waves, in response to the passage of the starting gate.

I claim:

1. A handicapped start arrangement for a race having a starting gate movable over a predetermined approach to the starting line of the race, said arrangement comprising:
   a plurality of sensing devices spaced apart along said approach and operative individually in response to the movement of the starting gate past them;
   and visual indicator devices along said approach connected to said sensing devices for sequential operation thereby to indicate the correct handicapped distance behind the moving starting gate.

2. A handicapped start arrangement for a race having a starting gate movable along a predetermined approach to the starting line of the race, said arrangement comprising:
   a plurality of sensing devices spaced apart in succession along said approach and responsive to the movement of the starting gate past them;
   and a plurality of visual indicators operatively connected individually to said sensing devices to be operated thereby and spaced apart in succession along said approach at predetermined distances behind the respective sensing devices to indicate visually to the handicapped racer the correct handicapped distance behind the moving starting gate.

3. A handicapped start arrangement for a race having a starting gate movable along a predetermined approach to the starting line of the race, said arrangement comprising:
   a plurality of individual sensing devices spaced apart in succession along said approach and each individually operative to sense the movement of the starting gate past it;
   and a plurality of electric lamps positioned in sucession along said approach at predetermined distances behind the respective sensing devices and connected individually to said sensing devices for operation thereby to indicate to the handicapped driver his proper handicapped distance behind the moving starting gate as the starting gate approaches the starting line.

4. A handicapped start arrangement for a race having a starting gate movable over a predetermined approach to the starting line of the race, said arrangement comprising:
   a plurality of photoelectric cells at spaced intervals along said approach for operation individually in succession by a light source on the starting gate;
   and a plurality of electric lamps connected respectively to said photoelectric cells to be operated individually thereby and positioned along said course at predetermined distances behind the respective photo electric cells to indicate the correct handicap distance behind the moving starting gate as the starting gate approaches the starting line.

5. A racing start arrangement according to claim 4, wherein said lamps are normally unlit and are connected to be lit in response to the operation of the respective photoelectric cells by the passage of the starting gate.

6. A racing start arrangement according to claim 4, wherein said lamps are normally lit and are connected to be extinguished in response to the operation of the respective photoelectric cells by the passage of the starting gate.

7. A handicapped racing start arrangement for harness races comprising:
   a race track having a side rail;
   a starting gate movable along said track over a predetermined approach to the starting line of the race, said starting gate having a light source thereon directed toward said side rail;
   a plurality of photoelectric cells at said side rail at spaced intervals along said approach to the starting line, said photoelectric cells being individually operated by said light source on the starting gate as the starting gate goes by;
   and a plurality of electric lamps connected respectively to said photoelectric cells to be operated thereby and positioned along said side rail at predetermined distances behind the respective photoelectric cells to indicate to the handicapped driver his correct handicapped distance behind the moving starting gate as the starting gate approaches the starting line.

8. A racing start arrangement according to claim 7, wherein said lamps are normally unlit and are connected to be lit in response to the operation of the respective photoelectric cells by the light source on the starting gate.

9. A racing start arrangement according to claim 7, wherein said lamps are normally lit and are connected to be extinguished in response to the operation of the respective photoelectric cells by the light source on the starting gate.

References Cited by the Examiner

UNITED STATES PATENTS

| 1,870,768 | 8/1932 | Comfort et al. | 119—15.5 |
| 1,878,218 | 9/1932 | White | 119—15.5 |
| 2,547,332 | 4/1951 | Loveless et al. | 119—15.5 X |

FOREIGN PATENTS

| 308,036 | 3/1929 | Great Britain. |

SAMUEL KOREN, *Primary Examiner.*

ALDRICH F. MEDBERRY, *Assistant Examiner.*